United States Patent [19]

Gutierrez et al.

[11] Patent Number: 4,933,098

[45] Date of Patent: Jun. 12, 1990

[54] LACTONE MODIFIED VISCOSITY MODIFIERS USEFUL IN OLEAGINOUS COMPOSITIONS

[75] Inventors: Antonio Gutierrez, Mercerville; Robert D. Lundberg, Bridgewater, both of N.J.

[73] Assignee: Exxon Chemical Patents Inc., Linden, N.J.

[21] Appl. No.: 178,396

[22] Filed: Apr. 6, 1988

[51] Int. Cl.$^5$ .......................................... C10M 105/08
[52] U.S. Cl. ........................... 252/51.5 A; 252/51.5 R
[58] Field of Search .................... 252/51.5 A, 51.5 R

[56] References Cited

U.S. PATENT DOCUMENTS

| | | | |
|---|---|---|---|
| 2,890,208 | 6/1959 | Young | 528/357 |
| 3,219,666 | 9/1965 | Norman et al. | 544/383 |
| 3,316,177 | 4/1967 | Dorer, Jr. | 252/51.5 A |
| 3,326,804 | 6/1967 | Hu | 252/34 |
| 3,381,022 | 4/1968 | Le Suer | 260/404.8 |
| 3,522,179 | 7/1970 | Le Suer | 252/51.5 A |
| 3,708,522 | 1/1973 | Le Suer | 260/404.8 |
| 3,950,341 | 4/1976 | Okamoto et al. | 544/372 |
| 4,017,406 | 4/1977 | Brois et al. | 252/51.5 A |
| 4,062,786 | 12/1977 | Brois et al. | 252/51.5 R |
| 4,089,794 | 5/1978 | Engel et al. | 252/51.5 A |
| 4,102,798 | 7/1978 | Ryer et al. | 252/51.5 A |
| 4,113,639 | 9/1978 | Lonstrup et al. | 252/51.5 A |
| 4,116,876 | 9/1978 | Brois et al. | 252/49.6 |
| 4,132,661 | 1/1979 | Waldbelbrig et al. | 252/51.5 A |
| 4,137,185 | 1/1979 | Gardiner et al. | 252/33 |
| 4,144,181 | 3/1979 | Elliott et al. | 252/33 |
| 4,160,739 | 7/1979 | Stambaugh et al. | 252/34 |
| 4,169,063 | 9/1979 | Kiovsky | 252/51.5 A |
| 4,169,836 | 10/1979 | Ryer et al. | 546/238 |
| 4,171,273 | 10/1979 | Waldbillig et al. | 252/51.5 A |
| 4,219,432 | 8/1980 | Girgenti et al. | 252/51.5 A |
| 4,234,435 | 11/1980 | Meinhardt et al. | 252/51.5 A |
| 4,292,184 | 9/1981 | Brois et al. | 252/46.3 |
| 4,362,635 | 12/1982 | Dhein et al. | 252/56 S |
| 4,379,914 | 4/1983 | Lundberg | 528/354 |
| 4,463,168 | 7/1984 | Lundberg | 528/355 |
| 4,502,970 | 3/1985 | Schetelich et al. | 252/32.7 E |
| 4,517,104 | 5/1985 | Bloch et al. | 252/51.5 A |
| 4,645,515 | 2/1987 | Wollenberg | 44/63 |
| 4,680,129 | 7/1987 | Plavac | 252/51.5 A |
| 4,741,848 | 5/1988 | Koch et al. | 252/49.6 |

FOREIGN PATENT DOCUMENTS 1054370 1/1967 United Kingdom .

Primary Examiner—William R. Dixon, Jr.
Assistant Examiner—James M. Hunter, Jr.
Attorney, Agent, or Firm—J. B. Murray, Jr.

[57] ABSTRACT

Oil soluble viscosity index improving additives comprising ethylene compolymers such as copolymers of ethylene and propylene; and ethylene, propylene and diolefin; etc. reacted or grafted with ethylenically unsaturated carboxylic acid moieties, preferably maleic anhydride moieties, and reacted with amines having two or more primary amine groups or at least one primary amine group and at least one secondary amine group and a carboxylic acid component, preferably alkylene polyamine and with alkenyl succinic anhydride such as polyisobutenyl succinic anhydride, are improved by being further reacted with a lactone, preferably a lactone having at least 6 atoms in the lactone ring. The resulting lactone modified products are useful per se as oil soluble V.I. additives in fuel and lubricating compositions including concentrates containing the additives.

66 Claims, No Drawings

LACTONE MODIFIED VISCOSITY MODIFIERS USEFUL IN OLEAGINOUS COMPOSITIONS

RELATED U.S. APPLICATIONS

This application is related to the following applications filed by the inventors herein: Ser. No. 916,218; Ser. No. 916,914; Ser. No. 916,913; Ser. No. 916,287; Ser. No. 916,908; Ser. No. 916,303; and Ser. No. 916,217. All of the above applications were filed on Oct. 7, 1986 and all of these related applications are expressly incorporated herein by reference in their entirety.

BACKGROUND OF THE INVENTION

1. Field of the Invention

This invention relates to polymeric viscosity index (V.I.) improvers useful as additives in petroleum oils, particularly lubricating oils, to concentrates containing said additives, and to methods for their manufacture and use. The present V.I. improver additives comprise a generally known class of V.I. improvers which have been post-treated by reaction with a lactone, preferably a $C_5$–$C_9$ polymerizable lactone. The V.I. improvers which are to be lactone modified in accordance with the present invention comprise, for example, a copolymer of ethylene with one or more $C_3$ to $C_{28}$ alpha-olefins, which has been grafted with acid moieties, e.g. maleic anhydride, and then reacted with a mixture of an acid component, and a polyamine having two or more primary amine groups. In the alternative, the acid component may be prereacted with the polyamine to form salts, amides, imides, etc. and are then reacted with the grafted olefin polymer.

2. Prior Art

The concept of derivatizing V.I. improving high molecular weight ethylene copolymers with acid moieties such as maleic anhydride, followed by reaction with an amine to form a V.I. dispersant oil additive is known in the art as indicated by the following patents.

U.S. Pat. No. 3,316,177 teaches ethylene copolymers such as ethylene-propylene, or ethylene-propylenediene, which are heated to elevated temperatures in the presence of oxygen so as to oxidize the polymer and cause its reaction with maleic anhydride which is present during the oxidation. the resulting polymer can then be reacted with alkylene polyamines.

U.S. Pat. No. 3,326,804 teaches reacting ethylene copolymers with oxygen or ozone to form a hydroperoxidized polymer, which is grafted with maleic anhydride, followed by reaction with polyalkylene polyamines.

U.S. Pat. No. 4,089,794 teaches grafting an ethylene copolymer with maleic anhydride using peroxide in a lubricating oil solution, wherein the grafting is preferably carried out under nitrogen, followed by reaction with polyamine.

U.S. Pat. No. 4,137,185 teaches reacting $C_1$ to $C_{30}$ monocarboxylic acid anhydrides, and dicarboxylic anhydrides, such as acetic anhydride, succinic anhydride etc. with an ethylene copolymer reacted with maleic anhydride and polyalkylene polyamine to inhibit cross linking and viscosity increase due to further reaction of any primary amine groups which are initially unreacted.

U.S. Pat. No. 4,144,181 is similar to 4,137,185 in that it teaches using a sulfonic acid to inactivate the remaining primary amine groups when a maleic anhydride grated ethylene-propylene copolymer is reacted with a polyamine.

U.S. Pat. No. 4,169,063 discloses reacting an ethylene copolymer in the absence of oxygen and chlorine at temperatures of 150° C. to 250° C., with maleic anhydride followed by reaction with polyamine.

U.S. Pat. No. 4,132,661 discloses grafting ethylene copolymer, using peroxide and/or air blowing, with maleic anhydride, and then reacting the grafted copolymer with a primary-tertiary diamine.

U.S. Pat. No. 4,160,739 teaches an ethylene copolymer which is grafted, using a free radical technique, with alternating maleic anhydride and a second polymerizable monomer such as methacrylic acid, which material are reacted with an amine having a single primary, or a single secondary, amine group.

U.S. Pat. No. 4,171,273 discloses reacting an ethylene copolymer with maleic anhydride in the presence of a free radical initiator and then with mixtures of $C_4$ to $C_{12}$ n-alcohol and amine such as N-aminopropylmorpholine or dimethylamino propyl amine to form a V.I.-dispersant-pour depressant additive.

U.S. Pat. No. 4,219,432 teaches maleic anhydride grafted ethylene copolymer reacted with a mixture of an amine having only one primary group together with a second amine having two or more primary groups.

U.S. Pat. No. 4,517,104 discloses V.I. improving ethylene copolymer, such as copolymers of ethylene and propylene or ethylene, propylene and diolefin, which are reacted or grafted with ethylenically unsaturated carboxylic acid moieties, preferably maleic anhydride moieties, and reacted with polyamines having two or more primary amine groups and a carboxylic acid component, preferably alkylene polyamine and alkenyl succinic anhydride such as polyisobutenyl succinic anhydride. The V.I. improvers disclosed in U.S. Pat. No. 4,517,104 also exhibit varnish inhibition and dispersancy properties.

The concept of polymerizing lactones having 6 to 10 atoms in their ring structure is also well known. For example, it is known that polymers of valerolactone or E-caprolactone can be prepared by reacting the lactone monomer with a hydroxyl or amine initiator. When reacting E-caprolactone, for example, the polymerization reaction may be illustrated by the following equations:

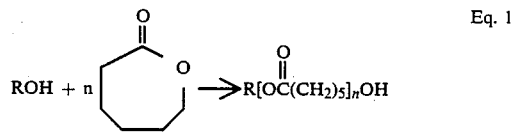

Eq. 1

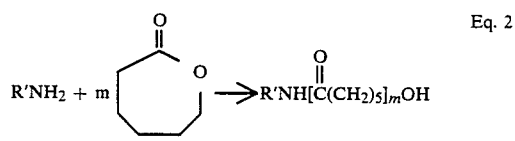

Eq. 2

The reactions are known to be catalyzed by various esterification catalysts such as stannous octanoate, and a variety of different molecular weight products are feasible depending upon the ratio of lactone to initiator. Molecular weights on the order of from a few hundred up to about 5,000 are reproducably achievable.

Caprolactone can also be polymerized to a very high molecular weight, e.g., on the order of 100,000 or more.

Typically such high molecular weight polymers do not employ initiators and preservation of functionality is not a requirement.

It is also known to react a lactone such as E-caprolactone with a polyol to form polyesters having terminal hydroxyl groups which are useful as plasticizers.

Other disclosures which relate generally to the polymeriztion of lactones and/or to the reaction of non-polymerizable lactones with fuel and/or lubricating oil additives are known as is illustrated by the following patents:

U.S. Pat. No. 4,645,515 discloses polyamine alkenyl or alkyl succinimides which have been modified by treatment with a lactone to yield polyamino alkenyl or alkyl succinimides wherein one or more of the basic nitrogens of the polyamino moiety is substituted with a hydroxyalkylene carbonyl group. The additives so disclosed are useful as dispersants in lubricating oils, gasolines, marine crank case oils and hydraulic oils.

U.S. Pat. No. 4,362,635 discloses synthetic ester oils which are esterification products of monoalcohols and dicarboxylic acids or of polyhydric alcohols and monocarboxylic acids respectively, containing 5 to 45% by weight of units of hydroxycarboxylic acids obtained from aliphatic alcohols, aliphatic, cycloaliphatic or aromatic carboxylic acids, and lactones of aliphatic $C_5$–$C_{12}$ hydrocarboxylic acids. The synthetic ester oils are suitable for the preparation of lubricants and lubricant compositions.

U.S. Pat. No. 2,890,208 discloses a process for polymerizing lactones to form lactone polyesters that are useful as plasticizers.

U.S. Pat. No. 4,062,786 and its continuation-in-part (U.S. Pat. No. 4,292,184) disclose lactone oxazoline reaction products of hydrocarbon substituted lactone carboxylic acids such as polybutyl lactone carboxylic acid, with a 2,2-disubstituted-2-amino-1-alkanol such as tris-(hydroxymethyl) amino-methane (THAM). The reaction products and their derivatives are disclosed as being useful additives in oleaginous compositions such as sludge dispersants for lubricating oil.

U.S. Pat. No. 4,379,914 and its continuation-in-part (U.S. Pat. No. 4,463,168) disclose the preparation of polycaprolactone polymers by reacting E-caprolactone with a diamine wherein one of the amine groups of the diamine is a tertiary amine and the other is a primary or secondary amine. The polycaprolactone polymers are disclosed as being useful for neutralizing certain sulfonic acid-containing polymers to form amine-neutralized, sulfonated derivatives which can be combined with an alkyl benzene sulfonic acid to give a surfactant which contains ester groups, hydroxyl groups and amine-neutralized sulfonate groups.

U.S. Pat. No. 3,169,945 discloses the preparation of lactone polyesters which are useful as plasticizers and as intermediates for preparing elastomers and foams. The polyesters can be prepared by reacting a lactone such a E-caprolactone with an initiator such as an alcohol, amine or amino alcohol.

While there are a number of prior art disclosures relating to polyalkenyl succinic acid or anhydride type dispersants, in general, little or no prior art of direct pertinence appears to have surfaced in regard to the present lactone modified V.I. improvers. Exemplary of the patent literature which relates to oil soluble polyalkenyl succinic acid or anhydride type dispersant additives are the following U.S. Patents:

U.S. Pat. No. 3,950,341 relates to oil soluble detergent dispersants which are prepared by reacting a polyalkenyl succinic acid or its anhydride with a hindered alcohol such as pentaerythritol, and then with an amine.

U.S. Pat. No. 3,708,522 relates to lubricating oil additives which are oil soluble, mono- or polycarboxylic acid esters which are post-treated with mono- or polycarboxylic acylating agents. Esters of polyisobutenyl-substituted succinic anhydride and pentaerythritol post-treated with maleic anhydride exemplify the process and compositions disclosed in this patent.

U.S. Pat. No. 4,169,836 discloses reacting hydrocarbon substituted dicarboxylic acids, esters, or anhydrides, for example, octadecenylsuccinic anhydride and polyisobutenyl succinic anhydride with 2,2-disubstituted-2-amino-1-alkanols, for example, THAM, to form oxazoline products which are useful as additives in oleaginous compositions, such as sludge dispersants for lubricating oil.

U.S. Pat. No. 4,017,406 discloses carboxylate half esters of 1-aza-3,7-dioxabicyclo[3.3.0]oct-5-yl methyl alcohol which are the reaction products of long chain dicarboxylic anhydrides, such as polyisobutenyl succinic anhydride, and aldehyde/THAM adducts. The esters are useful as lubricating oil additives, friction modifiers and the like, depending upon the molecular weight. The disclosure of this patent is expressly incorporated herein by reference.

U.S. Pat. No. 4,102,798 relates to all soluble oxazoline reaction products of polyisobutenyl succinic anhydride and THAM which are useful additives in oleaginous compositions, such as sludge dispersants for lubricating oil or gasoline.

U.S. Pat. Nos. 4,113,639 and 4,116,876 disclose an example of alkenyl succinic anhydride having a molecular weight of the alkenyl group of 1,300 and a Saponification Number of 103 (about 1.3 succinic anhydride units per hydrocarbon molecule). This alkenyl succinic anhydride may be reacted with polyamine and then boric acid (U.S. Pat. No. 4,113,639), or may be reacted with an amino alcohol to form an oxazoline (4,116,876) which is then borated by reaction with boric acid.

U.S. Pat. No. 3,219,666 discloses as dispersing agents in lubricants, derivatives of polyalkenyl succinic acids and nitrogen compounds, including polyamines. The preferred molecular weight of the polyalkenyl moieties is 750–5,000.

U.S. Pat. No. 4,234,435 discloses as oil additives, polyalkylene substituted dicarboxylic acids derived from polyalkylenes having a $M_n$ of 1300 to 5,000 and containing at least 1.3 dicarboxylic acid groups per polyalkylene. In Example 34 of that patent, a polyisobutene-substituted succinic acylating agent is reacted with caprolactam in the presence of mineral oil and sodium hydroxide.

U.S. Pat. No. 3,381,022 relates to ester derivatives of substantially saturated polymerized olefin-substituted succinic acid wherein the polymerized olefin substituent contains at least about 50 aliphatic carbon atoms and has a molecular weight of about 700 to 5,000. The esters include the acidic esters, diesters, and metal salt esters wherein the ester moiety is derived from monohydric and polyhydric alcohols, phenols and naphthols. The ester derivatives are useful as additives in lubricating compositions, fuels, hydrocarbon oils and power transmission fluids. A related application, i.e., U.S. Pat. No. 3,522,179, relates to lubricating compositions comprising a major amount of a lubricating oil and a minor proportion of an ester derivative of a hydrocarbon-substituted succinic acid sufficient to improve the detergency of the lubricating composition. The ester derivatives are similar to those described in U.S. Pat. No. 3,381,022 and contain at least about 50 aliphatic carbon atoms. The hydrocarbon substituent may be derived from a polymerized lower monoolefin having a molecular weight of from about 700 to about 5,000.

U.S. Pat. No. 4,502,970 discloses lubricating oil compositions useful in both gasoline engines and diesel engines. The compositions contain a polyisobutenyl succinicimide as a supplemental dispersant-detergent in combination with another conventional dispersant. The polyisobutenyl group has a $M_n$ of about 700–5,000.

U.S. Pat. No. 4,680,129 relates to polyamino alkenyl or alkyl succinimides wherein one or more of the nitrogens of the polyamino moiety is substituted with:

wherein $R_4$ is alkylene of from 1 to 6 carbon atoms; m is an integer of from 0 to 2; $R_5$ is alkylene to from 2 to 5 carbon atoms; p is an integer of rom 1 to 100; $R_6$ is selected from the group consisting of hydrogen and hydrocarbyl of from 1 to 30 carbon atoms; and with the proviso that if m is one or two then $R_6$ is hydrogen. The disclosed materials are additives which are useful as dispersants in marine crankcase oils, hydraulic oils, and lubricating oils. The examiner's attention is directed to the disclosure at column 9 where in Formula Ia there is shown the product formed by reaction of excess glycolic acid.

All of the above discussed patents are expressly incorporated herein by reference in their entirety.

SUMMARY OF THE INVENTION

Despite the efficacy of prior art polymeric viscosity improver additives and oleaginous compositions in which there are contained, there is a need for more efficient and less costly V.I. improvers which can either perform better, or perform well at lower additive levels. Accordingly, it is a principal object of this invention to provide novel lactone modified polymeric V.I. improvers which are effective, and readily prepared under typical manufacturing conditions.

Another object is to provide a novel class of polymeric V.I. improvers which have been post-treated with a lactone, preferably a polymerizable $C_5$–$C_9$ lactone.

Another object is to provide a process for preparing more efficient V.I. improvers from lactones, preferably $C_5$–$C_9$ lactones, and known polymeric V.I. precursors comprising the reaction product of an oil soluble ethylene copolymer, a polyamine and a long chain hydrocarbyl substituted acylating agent, wherein the polymeric V.I. precursors contain lactone-reactive functionality.

A further object is to provide lubricant compositions and concentrates containing the novel lactone modified V.I. improvers of this invention.

Yet another object is to provide a novel class of oil soluble V.I. improvers from known ethylene copolymer V.I. improvers which have at least one lactone-reactive functional group in their structure.

Still another object is to provide polymeric V.I. improvers which have been post-treated with a lactone, preferably a polymerizable $C_5$–$C_9$ lactone, as well as lubricant compositions and concentrates containing the lactone post-reacted V.I. improvers.

The manner in which these and other objects can be achieved will be apparent from the detailed description of the invention which appears hereinbelow.

In one aspect of this invention, one or more of the above objects can be achieved by reacting a lactone such as butyrolactone or valerolactone, or preferably a polymerizable $C_5$–$C_9$ lactone such as E-caprolactone with an oil soluble ethylene copolymer V.I. improver.

In another aspect, one or more of the objects of this invention can be achieved by heating a non-polymerizable lactone such as butyrolactone or a polymerizable $C_5$–$C_9$ lactone such as E-caprolactone at a temperature of at least about 80° C., and preferably from about 90° C. to about 180° C. with an ethylene copolymer V.I. improver of the type comprising copolymers of ethylene and propylene or ethylene, propylene and diolefin, etc. which has been reacted or grafted with ethylenically unsaturated carboxylic acid moieties, such as maleic anhydride moieties, and reacted with polyamines having two or more primary amine groups and a carboxylic acid component, such as an alkylene polyamine and an alkylene succinic anhydride.

One or more additional objects of this invention are achieved by reacting a non-polymerizable lactone such as butyrolactone or a polymerizable lactone such as E-caprolactone with a V.I. improving ethylene copolymer-succinic acylating agent which has been post-treated with a polyamine to introduce into the structure thereof at least one lactone-reactive secondary amino group; one or more additional objects are accomplished by providing modified V.I. improver adducts produced by such a process.

One or more objects of this invention can be illustrated in connection with the reaction between E-caprolactone and a viscosity improving ethylene-propylene copolymer which has been reacted or grafted with maleic anhydride moieties, and further reacted with an alkylene polyamine having two primary amino groups and with polyisobutenyl succinic anhydride. This process can be characterized by the following general equation:

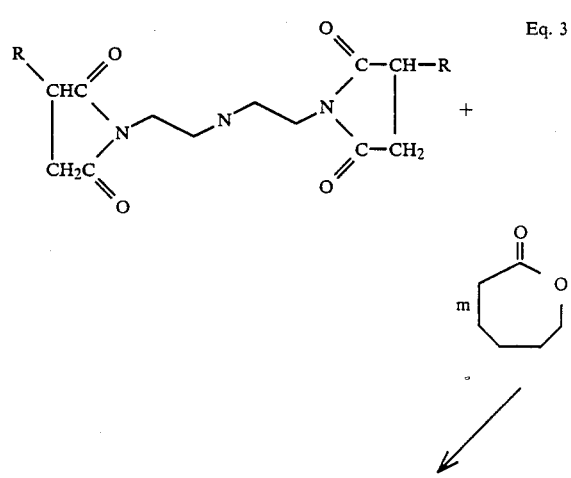

-continued

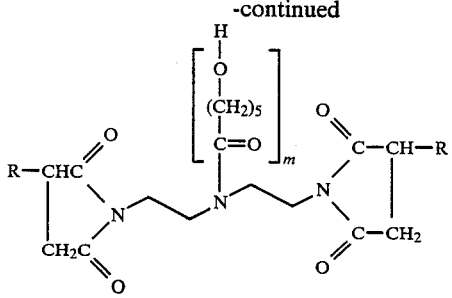

where R represents ethylene-propylene copolymer (hereinafter EP) having a number average molecular weight ($M_n$) of from about 15,000 to about 500,000 or polyisobutylene having a $M_n$ of from about 350 to about 5,000, and m has an average value of from about 0.2 to about 100.

The novel lactone modified V.I. improvers adducts of this invention are useful per se as an additive, e.g., a V.I. improver additive, for example, in the same manner as disclosed in U.S. Pat. No. 4,517,104 where prior art ethylene copolymer viscosity index improvers are used as viscosity improver-dispersant/additives in oil compositions, especially lubricants intended for use in the crankcase of internal combustion engines, gears, and power transmitting units. Accordingly, one or more objects of this invention are achieved by providing lubricating oil compositions, e.g., automatic transmission fluids, heavy duty oils suitable for use in the crankcases of gasoline and diesel engines, etc. containing the novel lactone modified viscosity index improvers of this invention. Such lubricating oil compositions may contain additional additives such as dispersants, antioxidants, corrosion inhibitors, detergents, pour depressants, antiwear agents, etc.

Still further objects are achieved by providing concentrate compositions comprising from about 50 to about 90 weight % of a normally liquid, substantially inert, organic solvent/diluent, e.g., mineral lubricating oil, or other suitable solvent/diluent, and from about 10 to about 50 weight % of a lactone modified viscosity index improver, as mentioned above and described in more detail hereinafter.

DESCRIPTION OF THE PREFERRED EMBODIMENTS

Ethylene Copolymer

Oil soluble ethylene copolymers used in the invention generally will have a number average molecular weight ($M_n$) of from about 15,000 to about 500,000; preferably 15,000 to 200,000 and optimally from about 20,000 to 100,000. In general, polymers useful as V.I. improvers will be used. These V.I. improvers will generally have a narrow range of molecular weight, as determined by the ratio of weight average molecular weight ($M_w$) to number average molecular weight ($M_n$). Polymers having a $M_w/M_n$ of less than 10, preferably less than 7, and more preferably 4 or less are most desirable. As used herein $M_n$ and $M_w$ are measured by the well known techniques of vapor phase osmometry (VPO), membrane osmometry and gel permeation chromatography. In general polymers having a narrow range of molecular weight may be obtained by a choice of synthesis conditions such as choice of principal catalyst and cocatalyst combination, addition of hydrogen during the synthesis, etc. Post synthesis treatment such as extrusion at elevated temperature and under high shear through small orifices, mastication under elevated temperatures, thermal degradation, fractional precipitation from solution, etc. may also be used to obtain narrow ranges of desired molecular weights and to break down higher molecular weight polymer to different molecular weight grades for V.I. use.

The polymers are prepared from ethylene and ethylenically unsaturated hydrocarbons, including cyclic, alicyclic and acyclic hydrocarbons containing from 3 to 28 carbons, e.g. 2 to 18 carbons. These ethylene copolymers may contain from 15 to 90 wt. % ethylene, preferably 30 to 80 wt. % of ethylene, and 10 to 85 wt. %, preferably 20 to 70 wt. %, of one or more $C_3$ to $C_{28}$, preferably $C_3$ to $C_{18}$, more preferably $C_3$ to $C_8$, alpha olefins. While not essential, such copolymers preferably have a degree of crystallinity of less than 25 wt. % as determined by X-ray and differential scanning calorimetry. Copolymers of ethylene and propylene are most preferred. Other alpha-olefins suitable in place of propylene to form the copolymer, or to be used in combination with ethylene and propylene to form a terpolymer, tetrapolymer, etc., include 1-butene, 1-pentene, 1-hexene, 1-heptene, 1-octene, 1-nonene, 1-decene, etc.; also branched chain alpha-olefins, such as 4-methyl-1-pentene, 4 methyl-hexene, 5-methylpentene-1, 4,4-dimethyl-pentene, and 6-methylheptene-1, etc., and mixtures thereof.

The term copolymer as used herein, unless otherwise indicated, includes terpolymers, tetrapolymers, etc., of ethylene, said $C_{3-28}$ alpha-olefin and/or a non-conjugated diolefin or mixtures of such diolefins which may also be used. The amount of the non-conjugated diolefin will generally range from about 0.5 to 20 mole percent, preferably about 1 to about 7 mole percent, based on the total amount of ethylene and alpha-olefin present.

Representative examples of non-conjugated dienes that may be used as the third monomer in the terpolymer include:

a. Straight chain acyclic dienes such as: 1,4-hexadiene; 1,5-heptadiene; 1,6-octadiene.

b. Branched chain acyclic dienes such as 5-methyl-1,4-hexadiene; 3,7-dimethyl 1,6-octadiene; 3,7-dimethyl 1,7-octadiene; and the mixed isomers of dihydro-myrcene and dihydro-cymene.

c. Single ring alicyclic dienes such as: 1,4-cyclohexadiene; 1,5 cyclooctadiene; 1,5 cyclo-dodecadiene; 4-vinylcyclohexene; 1-allyl, 4-isopropylidene cyclohexane; 3-allyl-cyclopentene; 4-ally cyclohexene and 1-iospropenyl-4-(4-butenyl)cyclohexane.

d. Multi-single ring alicyclic dienes such as: 4,4'-dicyclopentenyl and 4,4'-dicyclohexenyl dienes.

e. Multi-ring alicyclic fused and bridged ring dienes such as: tetrahydroindene; methyl tetrahydroindene; dicyclopentadiene; bicyclo(2.2.1)hepta 2,5-diene; alkyl, alkenyl, alkylidene, cycloalkenyl and cycloalkylidene norbornenes such as: ethylidine norbornene; 5-methylene-6-methyl-2-norbornene; 5-methylene-6, 6-dimethyl-2-norbornene; 5-propenyl-2-norbornene; 5-(3-cyclopen-tenyl)-2-norbornene and 5-cyclohexyldene-2-norbornene; norbonadiene; etc.

ETHYLENICALLY UNSATURATED CARBOXYLIC ACID MATERIAL

These materials which are grafted (attached) onto the ethylene copolymer contain at least one ethylenic bond and at least one, and preferably two, carboxylic acid groups, or anhydride groups, or polar groups which are convertible into said carboxyl groups by oxidation or hydrolysis. The carboxylic acid material comprises a $C_4$–$C_{10}$ monocarboxylic acid or a $C_4$–$C_{10}$ dicarboxylic acid wherein the carboxyl groups are located on vicinal carbon atoms. Maleic anhydride or a derivative thereof is preferred since it does not appear to homopolymerize appreciably, but rather grafts onto the ethylene copolymer to give two carboxylic acid functionalities. Such preferred materials have the generic formula

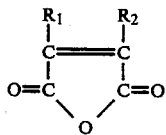

I wherein $R_1$ and $R_2$ are hydrogen or a halogen. Suitable examples additionally include chloro-maleic anhydride, itaconic anhydride, or the corresponding dicarboxylic acids, such as maleic acid or fumaric acid or their monoesters, etc.

As taught by U.S. Pat. No. 4,160,739 and U.S. Pat. No. 4,161,452 various unsaturated comonomers may be grafted on the olefin copolymer together with the unsaturated acid component, e.g. maleic anhydride. Such graft monomer systems may comprise one or a mixture of comonomers different from the unsaturated acid component and which contain only one copolymerizable double bond and are copolymerizable with said unsaturated acid component. Typically, such comonomers do not contain free carboxylic acid groups and are esters containing alpha, beta-ethylenic unsaturation in the acid or alcohol portion; hydrocarbons, both aliphatic and aromatic, containing alpha, beta-ethylenic unsaturation, such as the $C_4$–$C_{12}$ alpha olefins, for example isobutylene hexene, nonene, dodecene, etc.; styrenes, for example styrene, a methyl styrene, p-methyl styrene, p-sec. butyl styrene, etc.; and vinyl monomers, for example vinyl acetate, vinyl chloride, vinyl ketones such as methyl and ethyl vinyl ketone, etc. Comonomers containing functional groups which may cause cross linking, gelation or other interfering reactions should be avoided, although minor amounts of such comonomers (up to about 10% by weight of the comonomer system) often can be tolerated.

Specific useful copolymerizable comonomers include the following:

(A) Esters of saturated acids and unsaturated alcohols wherein the saturated acids may be monobasic or polybasic acids containing up to about 40 carbon atoms such as the following: acetic, propionic, butyric, valeric, caproic, stearic, oxalic, malonic, succinic, glutaric, adipic, pimelic, suberic, azelaic, sebacic, phthalic, isophthalic, terephthalic, hemimellitic, trimellitic, trimesic and the like, including mixtures. The unsaturated alcohols may be monohydroxy or polyhydroxy alcohols and may contain up to about 40 carbon atoms, such as the following: allyl, methallyl, crotyl, 1-chloroallyl, 2-chloroallyl, cinnamyl, vinyl, methyl vinyl, 1-phenallyl, butyenyl, propargyl, 1-cyclohexene-3-ol, oleyl, and the like, including mixtures.

(B) Esters of unsaturated monocarboxylic acids containing up to about 12 carbon atoms such as acrylic, methacrylic and crotonic acid, and an esterifying agent containing up to about 50 carbon atoms, selected from saturated alcohols and alcohol epoxides. The saturated alcohols may preferably contain up to about 40 carbon atoms and include monohydroxy compounds such as: methanol, ethanol, propanol, butanol, 2-ethylhexanol, octanol, dodecanol, cyclohexanol, cyclopentanol, neopentyl alcohol, and benzyl alcohol; and alcohol ethers such as the monomethyl or monobutyl ethers of ethylene or propylene glycol, and the like including mixtures. The alcohol epoxides include fatty alcohol epoxides, glycidol, and various derivatives of alkylene oxides, epichlorohydrin, and the like, including mixtures.

The components of the graft copolymerizable system are used in a ratio of unsaturated acid monomer component to comonomer component of about 1:4 to 4:1, preferably about 1:2 to 2:1 by weight.

GRAFTING OF THE ETHYLENE COPOLYMER

The grafting of the ethylene copolymer with the carboxylic acid material may be accomplished by any suitable method, such as thermally by the "ene" reaction, using copolymers containing unsaturation, such as ethylene-propylene-diene polymers either chlorinated or unchlorinated; or more preferably, the grafting may be accomplished by free radical induced grafting in bulk or in a solvent such as benzene or toluene, and preferably in a mineral lubricating oil solvent.

The radical grafting is preferably carried out using free radical initiators such as peroxides, hydroperoxides, and azo compounds and preferably those which have a boiling point greater than about 100° C. and which decompose thermally within the grafting temperature range to provide said free radicals. Representative of these free-radical initiators are azobutyro-nitrile, 2,5-dimethyl-hex-3-yne-2,5 bis-tertiary-butyl peroxide (sold as Lupersol 130) or its hexane analogue, di-tertiary butyl peroxide and dicumyl peroxide. The initiator is generally used at a level of between about 0.005% and about 1%, based on the total weight of the polymer solution, and temperatures of about 150° C. to 200° C.

The ethylenically unsaturated carboxylic acid material, preferably maleic anhydride, will be used generally in an amount ranging from about 0.01% to about 10%, preferably 0.1 to 2.0%, based on weight of the initial total solution. The aforesaid carboxylic acid material and free radical initiator are generally used in a weight percent ratio range of 11:1 to 30:1, preferably 3.0:1 to 10:1.

The initiator grafting is preferably carried out in an inert atmosphere, such as that obtained by nitrogen blanketing. While the grafting can be carried out in the presence of air, the yield of the desired graft polymer is generally thereby decreased as compared to grafting under an inert atmosphere substantially free of oxygen. The grafting time will usually range from about 0.1 to 12 hours, preferably from about 0.5 to 6 hours, more preferably 0.5 to 3 hours. The graft reaction usually will be carried out to at least approximately 4 times, preferably at least about 6 times the half-life of the free-radical initiator at the reaction temperature employed, e.g. with 2,5-dimethyl hex-3-yne-2, 5-bis(t-butyl peroxide) 2 hours at 160° C., and one hour at 170° C., etc.

In the grafting process, usually the copolymer solution is first heated to grafting temperature and thereafter the unsaturated carboxylic acid material and initiator are added with agitation, although they could have been added prior to heating. When the reaction is complete, the excess acid material can be eliminated by an inert gas surge, e.g. nitrogen sparging. Preferably the carboxylic acid material that is added is kept below its solubility limit in the polymer solution, e.g., below about 1 wt.%, preferably below 0.4 wt.% or less, of free maleic anhydride based on the total weight of polymer-solvent solution e.g. ethylene copolymer-mineral lubricating oil solution. Continuous or periodic addition of the carboxylic acid material along with an appropriate portion of initiator, during the course of the reaction, can be utilized to maintain the carboxylic acid below its solubility limits, while still obtaining the desired degree of total grafting.

In the initiator grafting step, the maleic anhydride or other carboxylic acid material used will be grafted onto both the polymer and the solvent for the reaction. Many solvents such as dichlorobenzene are relatively inert and may be only slightly grafted, while mineral oil will tend to be more grafted. The exact split of graft between the substrate present depends upon the polymer and its reactivity, the reactivity and type of oil, the concentration of the polymer in the oil, the maintenance of the carboxylic acid material in solution during the course of the reaction and the minimization of dispersed, but undissolved acid, e.g. the maleic anhydride, since undissolved acid material appears to have a greater tendency to react and form oil insoluble materials than does dissolved acid material. The split between grafted oil and grafted polymer may be measured empirically from the infrared analysis of the product dialyzed into oil and polymer fractions.

The grafting preferably is carried out in a mineral lubricating oil which need not be removed after the grafting step, since the oil can be used as the solvent in the subsequent reaction of the graft polymer with the amine material and as a solvent for the end product to form the lubricating additive concentrate. The oil, having attached or grafted carboxyl groups, will also be converted to the corresponding derivatives when reacted with the amine material.

The solution grafting step, when carried out in the presence of a high temperature decomposable peroxide, can be accomplished without substantial degradation of the chain length (molecular weight) of the ethylene-containing polymer. This can be an advantage as opposed to high temperature thermal reactions which depend on degradation to apparently form free radical reactive sites. Measurement of molecular weights and degradation can be evaluated by determination of the thickening efficiency (T.E.) of the polymer as described hereinafter.

THE AMINES

The amine component will have at least one and generally two or more primary amine groups, wherein the primary amine groups may be unreacted or wherein one of the amine groups may already be reacted. In cases where the amine contains only one primary amine group, the amine component must also contain at least one and preferably at least two secondary amine groups.

Preferred amine compounds have the following formulas: (A) aliphatic saturated amines:

     II and

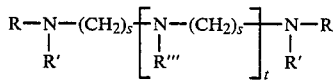     III where R, R', R", R''' are independently selected from the group consisting of hydrogen; $C_1$ to $C_{25}$ straight or branched chain alkyl radicals; $C_1$ to $C_{12}$ alkoxy $C_2$ to $C_6$ alkylene radicals; $C_1$ to $C_{12}$ alkylamino $C_2$ to $C_6$ alkylene radicals; and wherein R''' can additionally comprise a moiety of the formula:

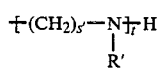     IV wherein R' is as defined above, and wherein s and s' can be the same or a different number from 2 to 6, preferably 2 to 4; and t and t' can be the same or different and are numbers of from 0 to 10, preferably 2 to 7, and most preferably about 3 to 7, with the proviso that the sum of t and t' is not greater than 15. To assure a facile reaction, it is preferred that R, R', R", R''', s, s', t, and t' be selected in a manner sufficient to provide the above compounds with typically at least one primary and secondary amine group, preferably at least two primary or secondary amine groups. This can be achieved by selecting at least one of said R, R', R", or R''' groups to be hydrogen or by letting t in formula III be at least one when R''' is H or when the IV moiety possesses a secondary amino group. The most preferred amines of the above formulas are represented by formula III and contain at least two primary amine groups and at least one, and preferably at least three, secondary amine groups.

(B) polyoxyalkylene polyamines:

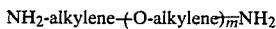     (V)

wherein m has a value of about 3 to 70 and preferably 10 to 35; and

     (VI)

wherein n has a value of about 1 to 40 with the provision that the sum of all the n's is from about 3 to about 70 and preferably from about 6 to about 35 and R is a polyvalent saturated hydrocarbon radial of up to ten carbon atoms having a valence of 3 to 6. The alkylene groups in either formula (V) or (VI) may be straight or branched chains containing about 2 to 7, and preferably about 2 to 4 carbon atoms.

Other useful amine compounds include: alicyclic diamines such as 1,4-di(aminomethyl) cyclohexane, and heterocyclic nitrogen compounds such as imidazolines, and N-aminoalkyl peperazines of the general formula VII:

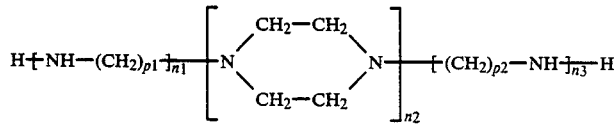

VII wherein $p_1$ and $p_2$ are the same or different and are each integers of from 1 to 4, and $n_1$, $n_2$ and $n_3$ are the same or different and are each integers of from 1 to 3. Non-limiting examples of such amines include 2-pentadecyl imidazoline: N-(2-aminoethyl) piperazine; etc.

Non-limiting examples of suitable aliphatic saturated amine compounds include: 1,2-diaminoethane; 1,3-diaminopropane; 1,4-diaminobutane; 1,6-diaminohexane; polyethylene amines such as diethylene triamine; triethylene tetramine; tetraethylene pentamine; polypropylene amines such as 1,2-propylene diamine; di-(1,2-propylene)triamine; di-(1,3-propylene) triamine; N,N-dimethyl-1,3-diamino-propane; N,N-di-(2-aminoethyl) ethylene diamine; N,N-di(2-hydroxyethyl)-1,3-propylene diamine; 3-dodecyloxypropylamine; N-dodecyl-1,3-propane diamine; tris hydroxymethylaminomethane (THAM); diisopropanol amine; diethanol amine; triethanol amine; mono-, di-, and tri-tallow amines; amino morpholines such as N-(3-amino-propyl)morpholine; and mixtures thereof.

Commercial mixtures of amine compounds may advantageously be used. For example, one process for preparing alkylene amines involves the reaction of an alkylene dihalide (such as ethylene dichloride or propylene dichloride) with ammonia, which results in a complex mixture of alkylene amines wherein pairs of nitrogens are joined by alkylene groups, forming such compounds as diethylene triamine, triethylenetetramine, tetraethylene, pentamine and isomeric piperazines. Low cost poly(ethyleneamines) compounds averaging about 5 to 7 nitrogen atoms per molecule are available commercially under trade names such as "polyamine H," "Polyamine 400," "Dow Polyamine E-100," etc.

The ethylene amines, which are particularly useful aliphatic saturated amines, are described, for example, in the Encyclopedia of Chemical Technology under the heading "Ethylene Amines" (Kirk and Othmer), Volume 5 pgs. 898–905; Interscience Publishers, New York (1950). These compounds are prepared by the reaction of an alkylene chloride with ammonia. This results in the production of a complex mixture of alkylene amines, including cyclic condensation products such as piperazines. While mixtures of these amines may be used for purposes of this invention, it is obvious that pure alkylene amines may be used with complete satisfaction.

The polyoxyalkylene polyamines of formulas V and VI above, preferably, polyoxyalkylene diamines and polyoxyalkylene triamines, may have average molecular weights ranging from about 200 to about 4,000 and preferable from about 400 to about 2,000. The preferred polyoxyalkylene polyamines include the polyoxyethylene and polyoxypropylene diamines and the polyoxypropylene triamines having average molecular weights ranging from about 200 to 2,000. The polyoxyalkylene polyamines are commercially available and may be obtained, for example, from the Jefferson Chemical Company, Inc. under the trade name "Jeffamines D-230, D-400, D-1000, D-2000, T-403:, etc.

THE ACID COMPOUNDS

The acid component includes; hydrocarbyl substituted succinic anhydride or acid having 12 to 49 carbons, (e.g. dodecyl, tetradodecyl, octadecyl, octadecenyl, etc.) preferably 16 to 49 carbons in said hydrocarbyl group; long chain monocarboxylic acid of the formula RCOOH where R is hydrocarbyl group of 25 to 400 carbons; and long chain hydrocarbyl substituted succinic anhydride or acid having 25 to 400 carbons in said hydrocarbyl groups. The hydrocarbyl groups are essentially aliphatic and include alkenyl and alkyl groups. The long chain acids and anhydrides are preferred, particularly when the grafting reaction is carried out in lubricating oil because of ability to impart dispersancy to reacted oil molecules as well as their greater solubilizing effect.

Primarily because of its ready availability and low cost, the long chain hydrocarbyl portion, e.g. lone chain alkenyl groups of the carboxylic acid or anhydride preferably is derived from a polymer of a $C_2$–$C_5$ monoolefin, said polymer generally having a molecular weight of about 350 to 5,000 e.g., 700 to about 5,000, most preferably 700 to 3,000. Particularly preferred is polyisobutylene.

PRE-REACTED AMINE-ACID COMPONENT

The aforesaid amine and acid components may be pre-reacted, with the acid being generally attached to the amine linkages so that a primary amine group of the polyamine is still available for reaction with the acid moieties of the grafted polymer. A convenient source of these prereacted materials are the well-known lubricating oil dispersants provided they retain primary amine groups capable of further reaction with the grafted polymer.

Usually, these dispersants are made by condensing a hydrocarbyl substituted monocarboxylic acid or a dicarboxylic acid, having about 25 to 400 carbons in the hydrocarbyl substituent, as described above under the "The Acid Component", preferably a succinic acid producing material such as alkenyl succinic anhydride, with an amine or polyamine, including those described above under "The Amines".

Monocarboxylic acid dispersants can be prepared by reacting a polyamine with a high molecular weight monocarboxylic acid derived from a polyolefin, such as polyisobutylene, by oxidation with nitric acid or oxygen; or by addition of halogen to the polyolefin followed by hydrolysis and oxidation; etc. Monocarboxylic acid dispersants can be prepared by halogenating, e.g. chlorinating a polyolefin, such as the polymers of $C_2$ to $C_5$ monoolefin, e.g. polypropylene or polyisobutylene, and then condensing the halogenated polyolefin with an alpha, beta-unsaturated, monocarboxylic acid of from 3 to 8, preferably 3 to 4, carbon atoms, e.g. acrylic acid, alpha-methyl-acrylic acid, ie., 2-methyl propanoic acid, crotonic acid, etc. and then reacting the resulting produce with polyamine.

Formation of dicarboxylic acid dispersants by reaction of an amine with alkenyl succinic anhydride prepared from the reaction of a polyolefin or chlorinated polyolefin and maleic anhydride, etc. is well known in the art, as seen, for example, in U.S. Pat. No. 3,272,746.

Most preferred are the lubricating oil dispersants made by reaction of the aforesaid "aliphatic saturated amines" previously described, with alkenyl succinic anhydride.

Reaction, preferably amination and/or imidation of the carboxylic acid material is usually done as a solution reaction with the acid material, usually polyisobutenyl-succinic anhydride, dissolved in a solvent such as mineral oil, to which the other reactant is added. The formation of the dispersants in high yield can be effected by adding from about 0.5-3.3:1, preferably about 0.7 to 1.3:1, and most preferably about 1:1 molar proportions of aliphatic saturated amine:alkenyl succinic anhydride to said solution and heating the mixture of 140° C. to 165° C. or higher until the appropriate amount of water of reaction is evolved. Typically the mineral oil solvent is adjusted so that it constitutes about 50% by weight of the final acyl nitrogen compound solution.

REACTION OF GRAFTED COPOLYMER WITH AMINE AND ACID COMPONENT

The grafted polymer, preferably in solution generally equal to about 5 to 30 wt.%, preferably 10 to 20 wt.% polymer, can be reacted readily with a mixture of amine and acid components, or with prereacted amine and acid, by being mixed with said grafted polymer and heated at a temperature of from about 100° C. to 150° C. preferably from about 170° C. to 230° C., for from about 1 to 10 hours, usually about 2 to about 6 hours. The heating is preferably carried out to favor formation of imides rather than amides and salts. This imide formation will give a lower viscosity of the reaction mixture than amide formation, and considerably lower than salt formation. This lower viscosity permits the utilization of a higher concentration of grafted ethylene copolymer in the reaction mixture. Removal of water assures completion of the imidation reaction. Reaction ratios can vary considerably depending upon the reactants, amounts of excess, type of bonds formed, etc. Generally from about 1 to 2, preferably about 1 mole of said bi-primary amine, and about 1 to 4, preferably from about 1.5 to 3, most preferably about 2 mole equivalent of said acid component (e.g. 2 moles of monocarboxylic or 1 mole of dicarboxylic acid component), is used, per mole of the grafted dicarboxylic acid moiety content, e.g. grafted maleic anhydride content. Alternatively, if prereacted amine and acid component is used, such as a dispersant, sufficient dispersant is used to give about 1 to 2 primary amine groups per dicarboxylic acid moiety in the grafted polymer, depending on whether primarily imides or amides are formed. Usually 1 to 2 moles of said dispersant is used per molar amount of said dicarboxylic acid moieties in the grafted polymer. For example, for making imides with an ethylene-propylene copolymer of about 40,000 $M_n$ i.e. a thickening efficiency of about 2.1 and averaging 4 maleic anhydride groups per molecule, about 4 moles of amine with two primary groups and about 4 moles of alkenyl succinic anhydride preferably would be used per mole of grafted copolymer.

THE LACTONE COMPONENT

The lactone component which is reacted with the above-described grafted ethylene copolymer/amine/acid component reaction products include lactones which are capable of undergoing a ring opening addition reaction using a secondary amine group on the grafted ethylene copolymer/amine/acid reaction products as the ring opening initiator. The lactones may be substituted or unsubstituted and the substituents, if any, may comprise, for example, alkyl, aryl, aralkyl, cycloalkyl, alkoxy or other groups which would not interfere with the ring opening reaction and adduct formation. The preferred lactones generally have no more than two substituent groups, and the more preferred lactones are unsubstituted.

The preferred lactones are polymerizable lactones having at least six atoms in the lactone ring, e.g., 6 to 10 atoms.

Non-limiting examples of the useful lactones include gamma-butyrolactone, methyl-gamma-butyrolactone, delta-valerolactone, methyl-delta-dihexyl-E-caprolactone, methyl-carpolactone, and the like, with E-caprolactone being particularly preferred.

REACTION OF LACTONE WITH GRAFTED ETHYLENE COPOLYMER/AMINE/ACID COMPONENT REACTION PRODUCT

In one aspect of the invention, the novel lactone modified viscosity index improving additives are prepared by reacting the lactone component using the secondary amine functionality of the intermediates formed by reacting the grafted ethylene copolymer with the amine and acid components (hereinafter refered to as the viscosity improving intermediates or precursors) as the ring opening addition and/or polymerization initiator.

The ring opening addition and/or polymerization of the lactone component may be carried out, with or without a catalyst, simply by heating a mixture of the lactone and viscosity improving intermediate material in a reaction vessel in the absence of a solvent at a temperature of about 50° C. to about 200° C., more preferably to a temperature of about 750° C. to about 180° C., and most preferably at about 90° C. to about 160° C., for sufficient period of time to affect ring opening addition and/or polymerization. Optionally, a solvent for the lactone and/or the polymeric viscosity improving intermediate and/or the desired reaction products can be employed to control viscosity and or reaction rates.

In one preferred embodiment of the invention a lactone is reacted with a viscosity improving intermediate which has been prepared by reacting an ethylene-propylene copolymer grafted with maleic anhydride moieties and reacted with an alkylene polyamine and a polyisobutenyl succinic acid or anhydride as outlined above. This reaction can be depicted generally, for example, by the equation:

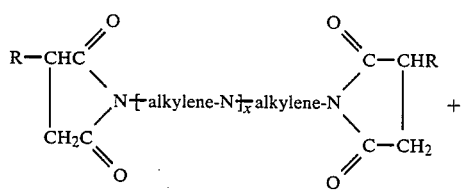

-continued

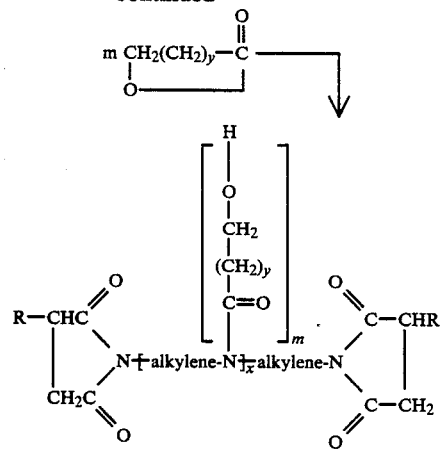

where R is ethylene-propylene copolymer, polyisobutylene and/or solvent, e.g. mineral oil, (when the ring opening reaction is conducted in the presence of a solvent); alkylene is an alkylene radical which is straight or branched chain and which contains from about 2 to about 7, preferably 2 to 4 carbon atoms; x is a number from 1 to about 10, preferably from 2 to about 7; y is a number from 1 to about 7, preferably from 3 to 6, and more preferably 4; and m has an average value of from about 0.2 to about 100, preferably from about 0.2 to 50, and more preferably from about 0.5 to about 20. It will be appreciated that a variety of products may be formed, and that in most cases, the reaction mass will comprise a mixture viscosity index improving lactone modified products. It will be appreciated, also, that when lactones having less than about five atoms in the lactone ring, such as butyrolactone, are employed, the average value of m in the above equation cannot exceed 1 under the reaction conditions disclosed herein.

Catalysts useful in the promotion of the above identified reactions, particularly in cases where the lactone component is a polymerizable lactone, are selected from the group consisting of stannous octanoate, stannous hexanoate, stannous oxalate, tetrabutyl titanate, a variety of metal organic based catalyst acid catalysts and amine catalysts, as described on page 266, and forward in a book chapter authored by R. D. Lundberg and E. F. Cox entitled, "Kinetics and Mechanisms of Polymerication: Ring Opening Polymerization"; edited by Frisch and Reegen, published by Marcel Dekker in 1969, where stannous octanoate is an especially preferred catalyst. The catalyst is added to the reaction mixture at a concentration level of about 50 to about 10,000 parts of catalyst per one million parts by weight of total reaction mixture.

In reactions discussed above, when a polymerizable lactone component is employed, the degree of polymerization (DP) of the lactone monomer may vary depending upon the intended application. At DP's much greater than about 10, e.g., greater than about 50, the lactone modified viscosity index improvers can exhibit crystallinity; a characteristic which is undesirable in an oil soluble additive due to the consequent high viscosity, or even solid, oil products which can be obtained. However, at lower DP's oil soluble viscosity index improvers are obtained. Accordingly, regardless of the identity of the lactones and viscosity improving precursors, the average value of m (or the degree of polymerization (DP)) should be between about 0.2 and about 100, more preferably between about 0.2 and 50, and most preferably between 0.5 and about 20.

THE COMPOSITIONS

The lactone modified additives of the present invention have been found to possess very good viscosity index improving properties as measured herein in a wide variety of environments.

Accordingly, the lactone modified additives are used by incorporation and dissolution into an oleaginous material such as lubricating oil or hydrocarbon fuel.

When the lactone modified viscosity index improvers of this invention are used in normally liquid petroleum fuels such as middle distillates boiling from about 65° to 430° C., including kerosene, diesel fuels, home heating fuel oil, jet fuels, etc., a concentration of the additive in the fuel in the range of typically from about 0.001 to about 0.5, and preferably 0.001 to about 0.1 weight percent, based on the total weight of the composition, usually will be employed.

However, the present lactone modified viscosity index improvers find their primary utility in lubricating oil compositions which employ a base oil in which the additives are dissolved or dispersed.

Such base oils may be natural or synthetic although the natural base oils will derive a greater benefit.

Thus, base oils suitable for use in preparing lubricating compositions of the present invention include those conventionally employed as crankcase lubricating oils for spark-ignited end compression-ignited internal combution engines, such as automobile and truck engines, marine and railroad diesel engines, and the like. Advantageous results are also achieved by employing the lactone modified viscosity index improving additives of the present invention in base oils conventionally employed in and/or adapted for use as power transmitting fluids such as automatic transmission fluids, tractor fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additives of the present invention.

Thus, the additives of the present invention may be suitably incorporated into synthetic base oils such as alkyl esters of dicarboxylic acids, polyglycols and alcohols; polyalphaolefins, alkyl benzenes, organic esters of phosphoric acids, polysilicone oils, etc.

Natural base oils include mineral lubricating oils which may very widely as to their crude source, e.g., whether paraffinic, naphthenic, mixed, paraffinic-naphthenic, and the like; as well as to their formation, e.g., distillation range, straight run or cracked, hydrofined, solvent extracted and the like.

More specifically, the natural lubricating oil base stocks which can be used in the compositions of this invention may be straight mineral lubricating oil or distillates derived from paraffinic, naphthenic, asphaltic, or mixed base crudes, or, if desired, various blends oils may be employed as well as residuals, particularly those from which asphaltic constituents have been removed. The oils may be refined by conventional methods using acid, alkali, and/or clay or other agents such as aluminum chloride, or they may be extracted oils produced, for example, by solvent extraction with solvents of the type of phenol, sulfur dioxide, furfural, dichlorodiethyl ether, nitrobenzene, crotonaldehyde, molecular sieves, etc.

The lubricating oil base stock conveniently has a viscosity of typically about 2.5 to about 12, and preferably about 2.5 to about 9 cs. at 100° C.

Thus, the lactone modified additives of the present invention can be employed in a lubricating oil composition which comprises lubricating oil, typically in a major amount, and the lactone modified additive, typically in a minor amount, which is effective to impart enhanced viscosity index improvement relative to the absence of the additive. Additional conventional additives selected to meet the particular requirements of a selected type of lubricating oil composition can be included as desired.

The viscosity index improvers of this invention are oil-soluble, dissolvable in oil with the aid of a suitable solvent, or are stably dispersible materials. Oil-soluble, dissolvable, or stably dispersible, as that terminology is used herein, does not necessarily indicate that the materials are soluble, dissolvable, miscible, or capable of being suspended in oil in all proportions. It does mean, however, that the lactone modified viscosity index improving additives, for instance, are soluble or stably dispersible in oil to an extent sufficient to exert their intended effect in the environment in which the oil is employed. Moreover, the additional incorporation of other additives may also permit incorporation of higher levels of a particular lactone modified viscosity index improver, if desired.

Accordingly, while any effective amount of the present viscosity index improving additives can be incorporated into the lubricating oil composition, it is contemplated that such effective amount be sufficient to provide said lube oil composition with an amount of the additive of typically from about 0.1 to about 10 wt.%, e.g., 0.3 to 8 wt.%, and preferably from about 0.5 to about 5 wt.%, based on the weight of the total composition.

The viscosity index improving additives of the present invention can be incorporated into the lubricating oil in any convenient way. Thus, they can be added directly to the oil by dispersing, or dissolving the same in the oil at the desired level of concentration typically with the aid of a suitable solvent. Such blending can occur at room temperature or elevated temperatures. Alternatively, the dispersant additives may be blended with a suitable oil-soluble solvent and/or base oil to form a concentrate, and then blending the concentrate with lubrication oil base stock to obtain the final formulation. Concentrates typically will contain from about 10 wt.% to about 50 wt.%, preferably 10 to 30 wt.% viscosity index improving additive, and typically from about 50 to about 90%, preferably from about 70 to about 90% by weight base oil, based on the concentrate weight.

The lubricating oil base stock for the viscosity index improving additives of the present invention typically is adapted to perform a selected function by the incorporation of additives therein to form lubricating oil compositions (i.e., formulations).

Representative additives typically present in such formulations include dispersants, other viscosity modifiers, corrosion inhibitors, oxidation inhibitors, friction modifiers, anti-foaming agents, anti-wear agents, pour point depressants, neutral or overbased metal detergents (e.g. Ca or Mg sulfonates or phenates), demulsifiers, and the like.

Viscosity modifiers impart high and low temperature operability to the lubricating oil and permit it to remain shear stable at elevated temperatures and also exhibit acceptable viscosity or fluidity at low temperatures.

Viscosity modifiers are generally high molecular weight polymers including hydrocarbon polymers and polyesters. The viscosity modifiers may also be derivatized to include other properties or functions, such as the addition of dispersancy properties. Oil soluble viscosity modifying polymers will generally have number average molecular weights of from $10^3$ to $10^6$, preferably $10^4$ to $10^6$, e.g., 20,000 to 250,000, as determined by gel permeation chromatography or membrane osmometry.

Representative examples of suitable viscosity modifiers which may be used in combination with the lactone modified viscosity index improving additives of the present invention are any of the types known to the art including polyisobutylene, copolymers of ethylene and propylene, polymethacrylates, methacrylates copolymers, copolymers of an unsaturated dicarboxylic acid and vinyl compound and interpolymers of styrene and acrylic esters.

Corrosion inhibitors, also known as anticorrosive agents, reduce the degradation of the metallic parts contacted by the lubricating oil composition. Illustrative of corrosion inhibitors are zinc dialkyldithiophosphates, phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of carbon dioxide. Phosphosulfurized hydrocarbons are prepared by reacting a suitable hydrocarbon such as a terpene, a heavy petroleum fraction of a $C_2$ to $C_6$ olefin polymer such as polyisobutylene, with from 5 to 30 wt.% of a sulfide of phosphorus for ½ to 15 hours, at a temperature in the range of 150° to 600° F. Neutralization of the phosphosulfurized hydrocarbon may be effected in the manner taught in U.S. Pat. No. 1,969,324.

Oxidation inhibitors reduce the tendency of mineral oils to deteriorate in service which deterioration is evidenced by the products of oxidation such as sludge and varnish-like deposits on the metal surfaces. Such oxidation inhibitors include alkaline earth metal salts of alkylphenolthioesters having preferably $C_5$ to $C_{12}$ alkyl side chains, e.g., calcium nonylphenol sulfide, barium t-octylphenyl sulfide, dioctylphenylamine, phenylalphanaphthylamine, phosphosulfurized or sulfurized hydrocarbons, etc.

Friction modifiers serve to impart the proper friction characteristics to lubricating oil compositions such as automatic transmission fluids.

Representative examples of suitable friction modifiers are found in U.S. Pat. No. 3,933,659 which discloses fatty acid esters and amides; U.S. Pat. No. 4,176,074 which describes molybdenum complexes of polyisobutenyl succinic anhydride-amino alkanols; U.S. Pat. No. 4,105,571 which discloses glycerol esters of dimerized fatty acids; U.S. Pat. No. 3,779,928 which discloses alkane phosphonic acid salts; U.S. Pat. No. 3,778,375 which discloses reaction products of a phosphonate with an oleamide; U.S. Pat. No. 3,852,205 which discloses S-carboxyalkylene hydrocarbyl succinimide, S-carboxyalkylene hydrocarbyl succinamic acid and mixtures thereof; U.S. Pat. No. 3,879,306 which discloses N-(hydroxyalkyl)alkenyl-succinamic acids or succinimides; U.S. Pat. No. 3,932,290 which discloses reaction products of di-(lower alkyl) phosphites and epoxides; and U.S. Pat. No. 4,028,258 which discloses the alkylene oxide adduct of phosphosulfurized N-(hydroxyalkyl) alyenyl succinimides. The disclosures of the above references are herein incorporated by reference. The most preferred friction modifiers are succinate esters, or metal salts thereof, of hydrocarbyl substituted succinic acids or anhydrides and thiobis alkanols such as described in U.S. Pat. No. 4,344,853.

Dispersants maintain oil insolubles, resulting from oxidation during use, in suspension in the fluid thus preventing sludge flocculation and precipitation or deposition on metal parts. Suitable dispersants include high molecular weight alkyl succinates, the reaction product of oil-soluble polyisobutylene succinic anhydride with ethylene amines such as tetraethylene pentamine and borated salts thereof.

Pour point depressants lower the temperature at which the fluid will flow or can be poured. Such depressants are well known. Typically of those additives which usefully optimize the low temperature fluidity of the fluid are $C_8$-$C_{18}$ dialkylfumarate vinyl acetate copolymers, polymethacrylates, and wax naphthalene. Foam control can be provided by an antifoamant of the polysiloxane type, e.g., silicone oil and polydimethyl siloxane.

Anti-wear agents, as their name implies, reduce wear of metal parts. Representatives of conventional anti-wear agents are zinc dialkyldithiophosphates, zinc diaryldithiosphates and magnesium sulfonate.

Detergents and metal rust inhibitors include the metal salts of sulphonic acids, alkyl phenols, sulfurized alkyl phenols, alkyl salicylates, naphthenates and other oil soluble mono- and di-carboxylic acids. Highly basic (viz, overbased) metal salts, such as highly basic alkaline earth metal sulfonates (especially Ca and Mg slats) are frequently used a detergents. Representative examples of such materials, and their methods of preparation, are found in co-pending Ser. No. 754,001 filed July 11, 1985, the disclosure of which is hereby incorporated by reference.

Some of these numerous additives can provide a multiplicity of effects, e.g., a dispersant-oxidation inhibitor. This approach is well known and need not be further elaborated herein.

Some of these numerous additives can provide a multiplicity of effects, e.g., a dispersant-oxidation inhibition. This approach is well known and need not be elaborated upon further herein.

Compositions, when containing these conventional additives are typically blended into the base oil in amounts which are effective to provide their normal attendant function. Representative effective amounts of such additives are illustrated as follows:

| Compositions | Wt. % A.I. (Preferred) | Wt. % A.I. (Broad) |
| --- | --- | --- |
| Viscosity Modifier | .01–4 | 0.01–12 |
| Detergents | 0.01–3 | 0.01–20 |
| Corrosion Inhibitor | 0.01–1.5 | .01–5 |
| Oxidation Inhibitor | 0.01–1.5 | .01–5 |
| Dispersant | 0.1–8 | .1–20 |
| Pour Point Depressant | 0.01–1.5 | .01–5 |
| Anti-Foaming Agents | 0.001–0.15 | .001–3 |
| Anti-Wear Agents | 0.001–1.5 | .001–5 |
| Friction Modifiers | 0.01–1.5 | .01–5 |
| Mineral Oil Base | Balance | Balance |

When other additives are employed, it may be desirable, although not necessary, to prepare additive concentrates comprising concentrated solutions or dispersions of the other additives, i.e., other than the present viscosity index improvers, (said concentrate when constituting an additive mixture being referred to herein as an additive-package) whereby several additives can be added simultaneously to the base oil to form a lubricating oil composition which lacks only the viscosity index improvers. Dissolution of the additive concentrate into the lubricating oil may be facilitated by solvents and by mixing accompanied with mild heating, but this is not essential. The concentrate or additive-package typically will be formulated to contain the additives in proper amounts to provide the desired concentration in the final formulation when the additive-package is combined with a predetermined amount of base lubricant. Thus, the desired additives, other than the viscosity index improver of the present invention, can be added to small amounts of base oil or other compatible solvents to form additive-packages containing active ingredients in collective amounts of typically from about 2.5 to about 90%, and preferably from about 5 to about 75%, and most preferably from about 8 to about 50% by weight additives in the appropriate proportions with the remainder being base oil.

The final formulations may employ typically about 10 wt.% of the additive-package with the remainder being base oil.

All of said weight percents expressed herein are based on active ingredient (A.I.) content of the additive, and/or upon the total weight of any additive-package, or formulation which will be the sum of the A.I. weight of each additive plus the weight of total oil or diluent.

This invention will be further understood by reference to the following examples, wherein all parts are parts by weight and all molecular weights are number average molecular weights unless otherwise noted, and which include preferred embodiments of the invention.

EXAMPLE 1

Ethylene-propylene copolymer grafted with maleic anhydride (EPSA) in an oil solution was prepared in a reaction flask equipped with a stirrer, thermometer, dropping funnel, nitrogen inlet so as to maintain a nitrogen blanket, an overhead condenser and water trap. The preparation was carried out by dissolving 200 grams of ethylene-propylene copolymer in 800 grams of Solvent 100 Neutral oil (SN), which is a mineral lubricating oil having a viscosity of about 100 SUS at 37.8° C. in said reactor by warming to about 100° C. under a nitrogen blanket. Then 8.4 grams of maleic anhydride and 2.1 grams of ditertiary butyl peroxide as a free radical initiator were added and the reaction mixture was further heated with stirring to 190° C. and maintained at this temperature for about one-half hour, followed by nitrogen stripping for another one-half hour to remove volatiles and then followed by cooling to give the oil solution of the grafted polymer. The resulting oil solution analyzed for 0.10 meq. of anhydride per gram of solution. The ethylene-propylene copolymer consisted of about 44 wt.% ethylene and about 56 wt.% propylene and had a T.E. (thickening efficiency) of about 1.25 which represents a number average molecular weight of approximately 20,000.

Thickening efficiency (T.E.) is defined as the ratio of the weight percent of a polyisobutylene (sold as an oil solution by Exxon Chemical Co. as Paratone N), having a Staudinger Molecular Weight of 20,000, required to thicken a solvent-extracted neutral mineral lubricating oil, having a viscosity of 150 and an ASTM pour point of 0° F., (Solvent 150 Neutral) to a viscosity of 12.4 centistokes at 98.9° C. to the weight percent of a test copolymer required to thicken the same oil to the same viscosity at the same temperature. T.E. is related to $M_n$ and is a convenient, useful measurement for formulation of lubricating oils of various grades.

EXAMPLE 2

A polyisobutenyl succinic anhydride (PIBSA) having an SA:PIB ratio of 1.04 succinic anhydride (SA) moieties per polyisobutylene (PIB) molecule of 940 $M_n$ was prepared by heating a mixture of 100 parts of polyisobutylene with 13 parts of maleic anhydride to a temperature of about 220° C. When the temperature reached 120° C., chlorine addition was begun and 1.05 parts of chlorine at a constant rate were added to the hot mixture for about 5 hours. The reaction mixture was then heat soaked at 220° C. for about 1.5 hours and then stripped with nitrogen for about 1 hour. The resulting polyisobutenyl succinic anhydride had an ASTM Saponification Number of 112 which calculates to a succinic anhydride (SA) to polyisobutylene (PIB) ratio of 1.04 based upon the starting PIB as follows:

$$\text{SA:PIB ratio} = \frac{SAP \times M_n}{112200 - (96 \times SAP)} =$$

$$\frac{112 \times 940}{112200 - (96 \times 112)} = 1.04$$

The PIBSA product was 90 wt.% active ingredient (a.i.), the remainder being primarily unreacted PIB. The SA:PIB ratio of 1.04 is based upon the total PIB charged to the reactor as starting material, i.e. both the PIB which reacts and the PIB which remains unreacted.

EXAMPLE 3

Part A 2000 grams of oil concentrate containing about 20 wt.% of the ethylene-propylene copolymer grafted with maleic anhydride prepared in accordance with EXAMPLE 1 having an acidity of about 0.1 meq./gram, were added to a reactor together with 1300 grams of Solvent 150 Neutral oil and 100 grams of the PIBSA prepared in EXAMPLE 2 and were heated to 150° C. with stirring in order to form an oil solution containing about 12 wt.% of the grafted ethylene-propylene copolymer. Then, 20.6 grams of diethylene triamine were slowly added over about 30 minutes to the reactor while maintaining the temperature at about 190° C. The reaction mixture was then nitrogen stripped for 2 hours and cooled to form a final product, (EPSA-DETA-PIBSA), which analyzed for 0.34 wt.% nitrogen for the oil solution.

EXAMPLE 4

The same procedure as in EXAMPLE 1 was followed except that the ethylene-propylene copolymer had a TE of 2.1 and was dissolved in S150N to make a 15 wt.% ethylene-propylene solution. The final grafted oil solution had an anhydride number of 0.14 meq. of anhydride per gram of solution.

EXAMPLE 5

About 500 grams of the EPSA-DETA-PIBSA product prepared in EXAMPLE 3 were mixed with 4.62 grams of E-caprolactone (CL) and 0.01 grams of stannous octanoate. The mixture was heated slowly heated to 160° C. while stirring under a nitrogen blanket. The mixture was kept at 160° C. for three hours. At the end of the third hour the resulting product (EPSA-DETA-PIBSA-CL) was nitrogen stripped at 160° C. for ten minutes and collected. Infrared Analysis of the reaction mixture showed that the lactone was completely reacted within the first hour.

EXAMPLE 6

The procedure of EXAMPLE 5 was repeated except that 9.24 grams of CL were reacted with the EPSA-DETA-PIBSA.

EXAMPLE 7

The procedure of EXAMPLE 5 was repated except that 500 grams of the EPSA-DETA-PIBSA product of EXAMPLE 4 were used instead of the EPSA-DETA-PIBS product of EXAMPLE 3

EXAMPLE 8

The procedure of EXAMPLE 7 was repeated except that 9.24 grams of CL were reacted with the EPSA-DETA-PIBSA.

EXAMPLE 9

The procedure of EXAMPLE 5 is repeated except that 3.5 grams of butyrolactone (BL) are used instead of the CL.

Samples of the EPSA-DETA-PIBSA products of EXAMPLES 3 and 4 (controls) and the various EPSA-DETA-PIBSA-CL products were then subjected to a standard sludge inhibition bench test (SIB) and a standard varnish inhibition bench test (VIB).

The SIB and VIB tests forecast the performance of a lubricant in a gasoline engine. These tests are described below:

The SIB test employs a used crankcase mineral lubricating oil composition having an original viscosity of about 325 SUS at 37.8° C. that has been used in a taxicab that was driven generally for short trips only, thereby causing a buildup of a high concentration of sludge precursors. The oil used contains only a refined base mineral oil, a viscosity index improver, a pour point depressant and zinc dialkyldithiophosphate antiwear additives. The oil contains no sludge dispersants. Such oil is acquired by draining and refilling taxicab crankcases at about 1,000–2,000 mile intervals.

The SIB test is conducted in the following manner: The used crankcase oil is freed of sludge by centrifuging for one half hour at about 39,000 gravities (gs). The resulting clear bright red oil is then decanted from the insoluble sludge particles. However, the supernatant oil still contains oil-soluble sludge precursors which, under the conditions employed by this test, tend to form additional oil-insoluble deposits of sludge. The sludge inhibiting properties of the additives being tested are determined by adding to portions of the used oil 0.5 wt.% on an active basis, of the particular additive being tested. Ten grams of each one being tested is placed in a stainless steel centrifuge tube and is heated at 140° C. for 16 hours in the presence of air. Following the heating, the tube containing the oil being tested is cooled and then centrifuged for 30 minutes at about 39,000 gs. Any deposits of new sludge that form in this step are separated from the decanting supernatant oil and then carefully washed with 15 ml. of pentane to remove all remaining oils from the sludge. The weight in milligrams of the new solid sludge that forms in the test is determined by drying the residue and weighing it. The results are reported as milligrams of sludge per ten grams of oil thus measuring differences as small as one part per ten thousand. The less new sludge formed, the more effective is the additive as a dispersant. In other words, if the additive is effective, it will hold at least a portion of the new sludge that forms on heating and oxidation, stably suspended in the oil so that it does not precipitate during the centrifuging period.

In the VIB test, a test sample consisting of ten grams of lubricating oil containing 0.5 wt.%, on an active basis, of the additive being evaluated is used. The test oil is a commercial lubricating oil obtained from a taxi after about 2,000 miles of driving with said lubricating oil. Each sample is heat soaked overnight at about 140° C. and thereafter centrifuged to remove the sludge. The supernatant fluid of each sample is subjected to heat cycling from about 150° C. to room temperature over a period of 3.5 hours at a frequency of about two cycles per minute. During the heating phase, a gas containing a mixture of 0.7 volume percent $SO_2$, 1.4 volume percent NO and the balance air is bubbled through the test samples and during the cooling phase, water vapor was bubbled through the test samples. At the end of the test period, which testing cycle can be repeated as necessary to determine the inhibiting effect of any additive, the wall surfaces of the test flasks in which the samples are contained are visually evaluated as to the varnish inhibition. The amount of varnish deposited on the walls is rated at values of from one to eleven with the higher number being the greater amount of varnish. It has been found that this test forecasts the varnish results obtained as a consequence of carrying out the ASTM MS-VD engine tests which is described more fully in ASTM Document for Multigrade Test Sequence for Evaluating Automotive Engine Oil, Sequence VD, Part 3 of STP 315H.

Table I, which follows, summarizes the compositions tested and the test results:

TABLE 1

| Comparative Runs | Additive | % Lactone[1] | CL/ EPSA[2] | SIB[3] | VIB[4] |
|---|---|---|---|---|---|
| A | EPSA-DETA-PIBSA (Ex. 3-control 1) | 0 | | 6.06 | 7.5 |
| A | ESPA-DETA-PIBSA-CL (Ex.5) | 1 | | 5.75 | 6 |
| A | EPSA-DETA-PIBSA-CL (Ex. 6) | 3 | | 6.44 | 6 |
| B | EPSA-DETA-PIBSA (Ex. 4-Control 2) | 0 | | 6.69 | 9 |
| B | EPSA-DETA-PIBSA-CL (Ex. 7) | 1 | | 7.63 | 7.5 |
| B | EPSA-DETA-PIBSA-CL (EX. 8) | 3 | | 5.50 | 6 |

[1] wt. % lactone based on the weight of the EPSA moiety
[2] mole ratio of caprolactone (CL) moieties to EPSA moieties
[3] sludge inhibition bench test rating in milligrams sludge per 10 milligrams oil
[4] varnish inhibition bench test rating on basis of 1 toll; the higher the rating, the greater the amount of varnish deposited The data in Table I indicate that the EPSA-DETA-PIBSA-CL adducts of the present invention result in superior VIB values in all cases for comparative runs A and B. The SIB values, which are acceptable in all cases, are superior to those reported for the unmodified EPSA-DETA-PIBSA control when the amount of CL in the adduct is 1% for comparative run A, and 3% for comparative run B. Thus, the data, particularly in VIB data, suggest that the present EPSA-DETA-PIBSA-CL adducts are likely to outperform the known EPSA-DETA-PIBSA V.I. additives of otherwise corresponding structure.

The present lactone modified additives, when used in low concentrations on the order of about 50 to about 3000 ppm, will function as flow improvers for lubricating oils and fuels. Such flow improvers modify the size, number and growth of wax crystals in lubricating oils and fuels in a manner sufficient to improve the low temperature: handling, pumpability, and/or vehicle operability.

As used herein, the term aliphatic saturated amine is meant to define the above-described amines of formulas II, III, and IV, and the term oxyalkylene amine is meant to define the above-described amines of formulas V and VI.

As will be evident to those skilled in the art, various modifications on this invention can be made or followed, in light of the foregoing disclosure and illustrative examples, tables and discussion, without departing from the spirit and scope of the disclosure or from the scope of the invention as set forth in the following claims.

What is claimed is:

1. A lactone modified reaction product useful as a viscosity index improver additive for lubricating oil compositions, comprising the reaction product of:
   (a) oil soluble ethylene copolymer comprising within the range of about 15 to 90 wt.% ethylene and about 10 to 85 wt.% of one or more $C_3$ to $C_{28}$ alpha-olefin, having a number average molecular weight within a range of about 15,000 to 500,000 and grafted with ethylenically unsaturated $C_4$-$C_{10}$ monocarboxylic acid or anhydride or $C_4$-$C_{10}$ dicarboxylic acid or anhydride wherein the carboxylic acid groups or anhydride groups are located on vicinal carbon atoms;
   (b) amine selected from the group consisting of amines having at least two primary amine groups and amines having at least one primary amine group and at least one secondary amine group;
   (c) long chain hydrocarbyl substituted succinic anhydride or acid having 25 and 400 carbon atoms; and
   (d) lactone, wherein (a), (b) and (c) are first reacted then (d) is reacted.

2. A reaction product according to claim 1, formed by simultaneously reacting said (a), (b) and (c) with removal of water, followed by the reacting of said (d).

3. A reaction product according to claim 1 wherein said (b) and (c) are first pre-reacted, followed by reaction with said (a), and then followed by the reaction of said (d).

4. A reaction product according to claim 1, wherein said (a) comprises a copolymer consisting essentially of about 30 to 80 wt.% ethylene and about 20 to 70 wt.% propylene, having a number average molecular weight in the range of about 15,000 to 200,000 grafted with maleic anhydride.

5. A reaction product according to claim 1, wherein said (c) is hydrocarbyl substituted succinic acid or anhydride wherein said hydrocarbyl substituent is an alkenyl or alkyl group derived from a polymer of $C_2$ to $C_5$ mono-olefin.

6. A reaction product according to claim 4, wherein (a) consists essentially of ethylene and propylene grafted with maleic anhydride, wherein about 1 to 2 molar proportions of (b) and about 1 to 4 molar proportions of (c) are used per molar proportion of maleic anhydride moiety.

7. The reaction product according to claim 1, wherein said (d) comprises a lactone having at least six atoms in the lactone ring.

8. The reaction product according to claim 1, wherein said (d) comprises a polymerizable lactone having from 6 to 10 atoms in the lactone ring.

9. The reaction product according to claim 1, wherein said (d) comprises E-caprolactone.

10. The reaction product according to any one of claims 1, 8 or 9 wherein the degree of polymerization of the lactone component (d) in said reaction product has an average value of from 0.5 to about 20.

11. The reaction product according to either of claims 4 or 5, wherein said lactone component (d) is E-caprolactone, and wherein the degree of polymerization of the lactone component (d) in said reaction product has an average value of from 0.5 to about 20.

12. The reaction product according to any one of claims 1, 4, or 5 wherein said (d) is gammabutyrolactone.

13. The reaction product according to any one of claims 1, 4, 5 or 9 wherein said (b) is alkylene polyamine of the general formula

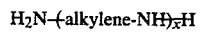

wherein x is about 1 to 10 and the alkylene radical is ethylene or propylene.

14. A reaction product according to claim 9, wherein said (c) is polyisobutenyl succinic anhydride having about 25 to 400 carbon atoms in said polyisobutenyl group.

15. A lactone modified reaction product useful as a viscosity index improver additive for lubricating oil compositions, comprising the reaction product of:
(a) a mixture of 5 to 30 weight % of ethylene copolymer in 95 to 70 weight % mineral lubricating oil, wherein both said copolymer and some of said oil have been reacted with maleic anhydride, then reacted with a mixture of (b) diethylene triamine and (c) polyisobutenyl substituted succinic anhydride having 25 to 400 carbons in the polyisobutenyl substituent, and then reacted with (d) a lactone having from 6 to 10 carbon atoms in the lactone ring.

16. The reaction product according to claim 15, wherein said lactone is E-caprolactone.

17. A lactone modified reaction product useful as a viscosity index improving additive for lubricating oil compositions, said lactone modified reaction product having been prepared by first reacting (i) 5 to 30 weight % of ethylene-propylene copolymer in 95 to 70 weight % mineral lubricating oil, wherein said copolymer has been free radical grafted with maleic anhydride using a free radical peroxide initiator, with (ii) an ashless dispersant to form an intermediate reaction product, wherein said ashless dispersant has been prepared from about 1 to 2 moles of a polyisobutenyl substituted succinic anhydride having 25 to 400 carbon atoms in the polyisobutenyl portion thereof, and a molar proportion of diethylene triamine, and then further reacting said intermediate reaction product with a lactone having from 6 to 10 atoms in lactone ring.

18. The reaction product according to claim 17, wherein said lactone is E-caprolactone.

19. A lactone modified reaction product useful as a viscosity index improver additive, said lactone modified reaction product having been prepared by first free radical grafting a mixture of 5 to 30 weight % of ethylene-propylene copolymer in 95 to 70 weight % mineral lubricating oil with maleic anhydride using a peroxide initiator, then simultaneously reacting the grafted mixture of said copolymer and lubricating oil with diethylene triamine and polyisobutenyl succinic anhydride, and then reacting the resulting product with a lactone.

20. The reaction product according to claim 19, wherein said lactone is butyrolactone.

21. The reaction product according to claim 19, wherein said lactone contains from 6 to 10 atoms in the lactone ring.

22. The reaction product according to claim 19, wherein said lactone is E-caprolactone.

23. An oil composition comprising a major proportion of oil selected from the group consisting of lubricating oil and about 0.1 to about 10 wt. % of an oil soluble reaction product comprising the reaction product of:
(a) oil soluble ethylene copolymer comprising within the range of about 15 to 90 wt.% ethylene and about 10 to 85 wt.% of one or more $C_3$ to $C_{28}$ alpha-olefin, having a number average molecular weight within a range of about 15,000 to 500,000 and grafted with ethylenically unsaturated $C_4$-$C_{10}$ monocarboxylic acid or anhydride or $C_4$-$C_{10}$ dicarboxylic acid or anhydride wherein the carboxylic acid groups or anhydride groups are located on vicinal carbon atoms;
(b) amine selected from the group consisting of amines having at least two primary amine groups and amines having at least one primary amine group and at least one secondary amine group;
(c) long chain hydrocarbyl substituted succinic anhydride or acid having 25 to 400 carbon atoms; and
(d) lactone, wherein (a), (b) and (c) are first reacted then (d) is reacted.

24. An oil composition according to claim 23, in which said lubricating oil is a crankcase motor lubricating oil and wherein said composition contains about 0.01 to 10 wt % of said oil soluble reaction product.

25. An oil composition which is an additive concentrate comprising a major amount of mineral lubricating oil and from about 10 to 50 wt. % of a reaction product comprising the product of reaction of:
(a) oil soluble ethylene copolymer comprising within the range of about 15 to 90 wt.% ethylene and about 10 to 85 wt.% of one or more $C_3$ to $C_{28}$ alpha-olefin, having a number average molecular weight within a range of about 15,000 to 500,000 and grafted with ethylenically unsaturated $C_4$-$C_{10}$ monocarboxylic acid or anhydride or $C_4$-$C_{10}$ dicarboxylic acid or anhydride wherein the carboxylic acid groups or anhydride groups are located on vicinal carbon atoms;
(b) amine selected from the group consisting of amines having at least two primary amine groups and amines having at least one primary amine group and at least one secondary amine group;

(c) long chain hydrocarbyl substituted succinic anhydride or acid having 25 to 400 carbon atoms; and
(d) lactone, wherein (a), (b) and (c) are first reacted then (d) is reacted.

26. A lubricating oil composition comprising a major amount of lubricating oil and a minor amount of a reaction product prepared by reacting:
(a) oil soluble ethylene copolymer comprising within the range of about 15 to 90 wt.% ethylene and about 10 to 85 wt.% of one or more $C_3$ to $C_{28}$ alpha-olefin, having a number average molecular weight within a range of about 15,000 to 500,000 and grafted with ethylenically unsaturated $C_4$-$C_{10}$ monocarboxylic acid or anhydride or $C_4$-$C_{10}$ dicarboxylic acid or anhydride wherein the carboxylic acid groups or anhydride groups are located on vicinal carbon atoms;
(b) amine selected from the group consisting of amines having at least two primary amine groups and amines having at least one primary amine group and at least one secondary amine group;
(c) long chain hydrocarbyl substituted succinic anhydride or acid having 25 to 400 carbon atoms; and
(d) lactone, wherein (a), (b) and (c) are first reacted then (d) is reacted.

27. A lubricating oil composition according to claim 26, wherein components (b) and (c) are first pre-reacted, followed by reaction with component (a), and then followed by reaction with component (d).

28. A lubricating oil composition according to claim 26, wherein component (a) comprises a copolymer consisting essentially of about 30 to 80 wt.% ethylene and about 20 to 70 wt.% propylene, having a number average molecular weight in the range of about 15,000 to 200,000, grafted with maleic anhydride.

29. A lubricating oil composition according to claim 26, wherein component (d) comprises a polymerizable lactone having from 6 to 10 atoms in the lactone ring.

30. A lubricating oil composition according to claim 26, wherein component (d) comprises E-caprolactone.

31. A lubricating oil composition comprising a major amount of lubricating oil and a minor amount of a reaction product formed by reacting (a) a mixture of 5 to 30 weight % of ethylene copolymer in 95 to 70 weight % mineral lubricating oil, wherein both said copolymer and some of said oil have been reacted with maleic anhydride, then reacted with a mixture of (b) diethylene triamine and (c) polyisobutenyl succinic anhydride having 25 to 400 carbons in said polyisobutenyl substituent, and then reacted with a lactone having from 6 to 10 atoms in the lactone ring.

32. A lubricating oil composition comprising a major amount of lubricating oil and a minor amount of a reaction product formed by first reacting (i) 5 to 30 weight % of ethylene-propylene copolymer in 95 to 70 weight % mineral lubricating oil, wherein said copolymer has been free radical grafted with maleic anhydride using a free radical peroxide initiator, with (ii) an ashless dispersant to form an intermediate reaction product, wherein said ashless dispersant has been prepared from about 1 to 2 moles of a polyisobutenyl substituted succinic anhydride having 25 to 400 carbon atoms in the polyisobutenyl portion thereof and a molar proportion of diethylene triamine, and then further reacting said intermediate reaction product with a lactone having from 6 to 10 atoms in lactone ring.

33. A lubricating oil composition comprising a major amount of lubricating oil and a minor amount of a reaction product prepared by first free radical grafting a mixture of 5 to 30 weight % of ethylene-propylene copolymer in 95 to 70 weight % mineral lubricating oil with maleic anhydride using a peroxide initiator, then simultaneously reacting the grafted mixture of said copolymer and lubricating oil with diethylene triamine and polyisobutenyl succinic anhydride, and then reacting the resulting product with a lactone.

34. An oil composition according to claim 24, wherein the lactone used to prepare said oil soluble reaction product is E-caprolactone.

35. An oil composition according to claim 24, wherein said oil soluble reaction product comprises the reaction product of:
(a) a mixture of 5 to 30 weight % of ethylene copolymer in 95 to 70 weight % mineral lubricating oil, wherein both said copolymer some of said oil have been reacted with maleic anhydride, then reacted with a mixture of (b) diethylene triamine and (c) polyisobutenyl succinic anhydride having 25 to 400 carbons in said polyisobutenyl substituent, and then reacted with (d) a lactone having from 6 to 10 carbon atoms in the lactone ring.

36. An oil composition according to claim 35, wherein the lactone used to prepare said oil soluble reaction product is E-caprolactone.

37. An oil composition according to claim 24, wherein said oil soluble reaction product has been prepared by first reacting (i) 5 to 30 weight % of ethylene-propylene copolymer in 95 to 70 weight % mineral lubricating oil, wherein said copolymer has been free radical grafted with maleic anhydride using a free radical peroxide initiator, with (ii) an ashless dispersant to form an intermediate reaction product, wherein said ashless dispersant has been prepared from about 1 to 2 moles of a polyisobutenyl substituted succinic anhydride having 25 to 400 carbon atoms in the polyisobutenyl portion thereof and a molar proportion of diethylene triamine, and then further reacting said intermediate reaction product with a lactone having from 6 to 10 atoms in lactone ring.

38. An oil composition according to claim 37, wherein said oil soluble reaction product has been prepared by first reacting (i) 5 to 30 weight % of ethylene-propylene copolymer in 95 to 70 weight % mineral lubricating oil, wherein said copolymer has been free radical grafted with maleic anhydride using a free radical peroxide initiator, with (ii) an ashless dispersant to form an intermediate reaction product, wherein said ashless dispersant has been prepared from about 1 to 2 moles of a polyisobutenyl substituted succinic anhydride having 25 to 400 carbon atoms in the polyisobutenyl portion thereof and a molar proportion of diethylene triamine, and then further reacting said intermediate reaction product with a lactone having from 6 to 10 atoms in lactone ring.

39. An oil composition according to claim 24, wherein said oil soluble reaction product comprises the product formed by first free radical grafting a mixture of 5 to 30 weight % of ethylene-propylene copolymer in 95 to 70 weight % mineral lubricating oil with maleic anhydride using a peroxide initiator, then simultaneously reacting the grafted mixture of said copolymer and lubricating oil with diethylene triamine and polyisobutenyl succinic anhydride, and then reacting the resulting product with a lactone.

40. An oil composition according to claim 39, wherein the lactone used to prepare said oil soluble reaction product is butyrolactone.

41. An oil composition according to claim 39, wherein the lactone used to prepare said oil soluble reaction product is E-caprolactone.

42. A lubricating oil composition according to claim 26, wherein said reaction product is formed by simultaneously reacting components (a), (b) and (c) with removal of water, followed by the reacting of component (d).

43. A lubricating oil composition according to claim 31, wherein said lactone is E-caprolactone.

44. A lubricating oil composition according to claim 32, wherein said lactone is E-caprolactone.

45. A lubricating oil composition according to claim 33, wherein said lactone is butyrolactone.

46. A lubricating oil composition according to claim 33, wherein said lactone is E-caprolactone.

47. In a process for preparing VI-additive for lubricating oil, which comprises grafting (i) an oil soluble ethylene copolymer having a number average molecular weight in the range of about 5,000 to 500,000 and comprising about 15 to 90 wt.% ethylene and about 10 to 85 wt.% $C_3$ to $C_{28}$ olefin, in a lubricating mineral oil solution, with (ii) maleic anhydride using a free radical initiator at elevated temperatures on the order of from about 150° C. to 200° C., and which further comprises the reaction of said grafted polymer in oil with (iii) an amine selected from the group consisting of amines having at least two primary amine groups and amines having at least one primary amine group and at least one secondary amine group and with (iv) long chain hydrocarbyl substituted succinic anhydride or acid having 25 to 400 carbon atoms, the improvement which comprises:

further reacting the grafted polymer-polyamine-succinic acid or anhydride reaction product with a lactone.

48. In a process according to claim 47, wherein said lactone is butyrolactone.

49. In a process according to claim 47, wherein said lactone has from 6 to 10 atoms in the lactone ring.

50. In a process according to claim 47, wherein said lactone is E-caprolactone.

51. In a process according to claim 50, wherein said V.I. additive contains the moiety

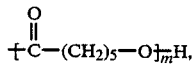

wherein said moiety is formed by the ring opening polymerization of said E-caprolactone and wherein m is the degree of polymerization of said E-caprolactone and has an average value of from about 0.2 to about 100.

52. In a process according to claim 51, where the degree of polymerization, m, has an average value of from about 0.5 to about 20.

53. In a process according to claim 41, wherein said V.I. additive contains the moiety

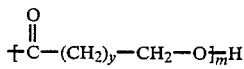

wherein said moiety is form by the ring opening polymerization of said lactone reactant, wherein y is a number of from 1 to about 7, and wherein m is the degree of polymerization of said lactone reactant and has an average value from about 0.2 to 50.

54. In a process according to any one of claims 50, 52 or 53, wherein the concentration of unreacted maleic anhydride is maintained below 1 wt.% maleic anhydride based on the weight of said copolymer and oil, during said grafting, wherein said ethylene copolymer has a number average molecular weight of about 20,000 to 200,000 and comprises about 30 to 80 wt.% ethylene and about 20 to 70 wt.% propylene, wherein said amine is selected from the group consisting of aliphatic saturated amines and oxyalkylene amines, and wherein said succinic anhydride or acid is polyisobutenyl succinic anhydride, said polyisobutylene moiety containing from about 25 to 400 carbon atoms.

55. In a process according to any one of claims 47, 50 or 53, wherein said amine is diethylene triamine in a relative molar ratio of about 1.5 to about 3.0 mole of said succinic anhydride and about 1.0 to 2.0 mole of said diethylene triamine per molar moiety of maleic anhydride grafted on said ethylene-propylene copolymer.

56. An oil soluble V.I. additive for use in oleaginous compositions, comprising the reaction product of:
 (a) oil soluble ethylene copolymer comprising within the range of about 15 to 90 wt.% ethylene and about 10 to 85 wt.% of one or more $C_3$ to $C_{28}$ alpha-olefin, having a number average molecular weight within a range of about 15,000 to 500,00 and grafted with ethylenically unsaturated $C_4$-$C_{10}$ monocarboxylic acid or anhydride or $C_4$-$C_{10}$ dicarboxylic acid or anhydride having the carboxylic acid groups or anhydride groups on vicinal carbon atoms;
 (b) aliphatic saturated amine or oxyalkylene amine;
 (c) long chain hydrocarbyl substituted succinic anhydride or acid having 25 to 400 carbon atoms; and
 (d) lactone, said lactone having undergone ring opening addition to the reaction product formed by reacting (a), (b) and (c) using secondary amine functionality as an initiator for the ring opening reaction such that the resulting lactone modified reaction product contains the moiety

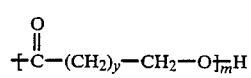

where y is a whole number of from about 1 to about 7, and m has an average value of from about 0.2 to about 100.

57. The oil soluble V.I. additive according to claim 46, wherein said lactone is butyrolactone.

58. The oil soluble V.I. additive according to claim 46, wherein said lactone has from 6 to 10 atoms in the lactone ring.

59. The oil soluble V.I. additive according to claim 46, wherein said lactone is E-caprolactone.

60. The oil soluble V.I. and according to claim 59, wherein m has an average value of from 0.2 to about 50.

61. The oil soluble V.I. and according to claim 59, wherein m has an average value of from 0.5 to about 20.

62. The oil soluble V.I. additive according to claim 56, wherein said additive is the reaction product of (a) reacted with (b), then with (c), and then with (d), and wherein (a) is ethylene-propylene copolymer grafted with maleic acid or anhydride, (b) is diethylene triamine, (c) is polyisobutylene succinic acid or anhydride, and (d) is E-caprolactone.

63. The oil soluble V.I. according to claim 56, wherein said additive is the reaction product of (a) reacted simultaneously with (b) and (c), followed by reaction with (d).

64. The oil soluble V.I. additive according to claim 56, wherein said additive is the reaction product of (a) reacted with the reaction product of (b) with (c), followed by reaction with (d).

65. The oil soluble additive according to claim 63 wherein (a) is ethylene-propylene copolymer grafted with maleic acid or anhydride, (b) is diethylene triamine, (c) is polyisobutylene succinic acid or anhydride, and (d) is E-caprolactone.

66. The oil soluble additive according to claim 64 wherein (a) is ethylene-propylene copolymer grafted with maleic acid or anhydride, (b) is diethylene triamine, (c) is polyisobutylene succinic acid or anhydride, and (d) is E-caprolactone.

* * * * *